United States Patent Office 2,796,399
Patented June 18, 1957

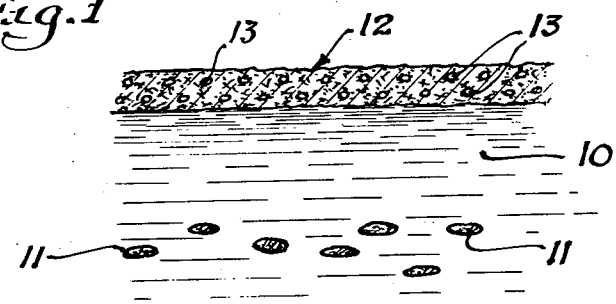
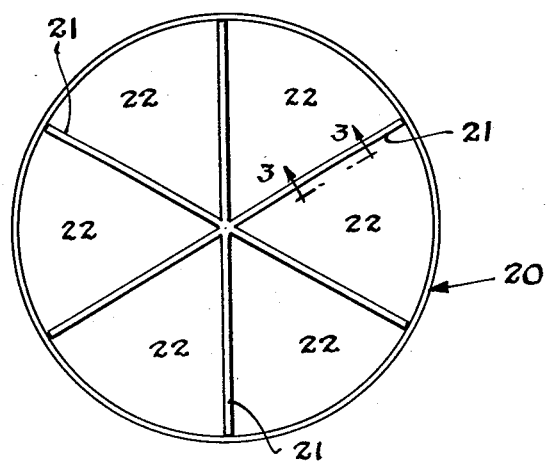
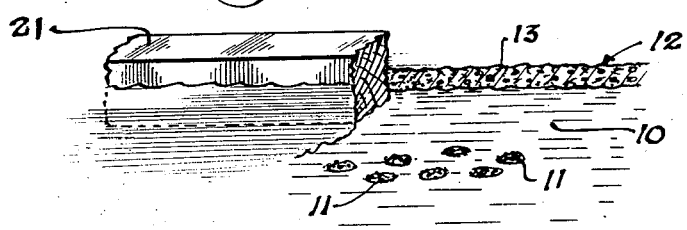

2,796,399

ODOR PREVENTION IN ANAEROBIC WASTE TREATMENT

Marion D. Sanders, Chesterton, Ind., and Frank W. Sollo, Jr., Chicago, Ill., assignors to Swift & Company, Chicago, Ill., a corporation of Illinois Application January 21, 1954, Serial No. 405,489

4 Claims. (Cl. 210—13)

The present invention relates in general to the anaerobic treatment of waste materials, and more particularly to a method for preventing or inhibiting the development of odors in connection with such treatment.

The treatment of industrial waste waters, including sewage as well as the discharge from manufacturing operations such as food processing, pulp, paper, leather and textile processes as well as many others, has long been a major problem. It has generally been considered that anaerobic processes would be most satisfactory in view of the relatively high concentration of organic materials in such industrial waste waters. However, for economical reasons the aerobic processes have been most frequently used. One of the prime reasons behind this economical consideration has been the development of odors in anaerobic processes. As a consequence, closed tanks have been required for such processes as well as associated means for collecting and destroying the noxious gases produced. Contrasted with this, the open tanks used in aerobic processes, such as the trickling filter or activated sludge processes, represent a much smaller equipment cost. The odor development in anaerobic processes is attributable to the fact that when the concentration of organic material exceeds the atmospheric oxygen supply, anaerobic bacteria attack the organic material, deriving their oxygen from the the reduction of such compounds as sulphates, nitrates, and other oxygen-containing salts. The reduction of some of these salts, notably sulphates, produce odorous gases as a by-product. Removal of these gases has heretofore required relatively expensive equipment.

It is therefore an object of the present invention to provide a method for inhibiting the development of odors in anaerobic processes.

It is a further object of the invention to provide a method for permitting anaerobic decomposition of waste materials to take place in an open tank without the development of objectionable odors.

Additional objects, if not specifically pointed out herein, will be readily apparent to one skilled in the art from the following detailed description of the invention.

In the drawings:

Figure 1 is a schematic illustration of a cross-section of an anaerobic digestion zone prepared by the method of the instant invention.

Figure 2 is a top plan view of an open anaerobic digestion zone such as may be used in the instant method.

Figure 3 is a partial cross-section taken on the line 3—3 of Figure 2.

In general, the present invention contemplates the provision of a permanent scum layer at the surface of the liquid body within which anaerobic decomposition is taking place.

More specifically, it has been discovered that if anaerobic decomposition is carried out in ponds or the like, open to the atmosphere, a natural scum of minute, living micro-organisms will form and eventually cover the entire surface of the pond. Before the surface of the entire pond is covered by such scum, odor development is pronounced and offensive. Once coverage of the pond surface takes place, the odor development stops. However, such scums are not permanent in nature but disappear periodically. It has been noted that just prior to the disintegration and sinking of the scum layer large numbers of the larvae of the psychoda and the drone fly appear on the scum. Upon disintegration of the scum, odor formation again develops to an objectionable degree.

It has now been found possible to prevent the periodic disintegration of the scum layer by applying a partial coating or discontinuous layer of a larvaecide, lighter than water, to the surface above the scum layer. The oil becomes distributed in various sized drops at the water surface and in the scum. Practically any oily liquid is suitable for this purpose, but for purposes of economy, used crankcase oil or similar lubricant is preferred. The amount of oil may be very small, for example, about ½₀ gallon per square foot of surface area being satisfactory. The oil is preferably applied by spraying, although it will generally disperse satisfactorily if added at one point only at the surface of the anaerobic zone. Since the oil is not attacked by bacteria, it is usually unnecessary to renew the oil after once applying it. However, if the present method is carried out in a pond having porous earth banks, it may be necessary to periodically replace that amount of the oil lost through seepage.

Referring now to the drawings, Figure 1 schematically illustrates the surface of an anaerobic digestion zone which has been treated in accordance with the present invention. The waste water 10, containing decomposing organic solids 11, is provided at the surface with a scum layer 12. Disposed in this scum layer 12, and at the surface of the water, are particles or various size drops of oil 13.

When applying the present method to large open tanks or ponds, it is desirable to minimize wind disturbance of the oil and scum layers. As illustrated in Figure 2, booms or floats 21 may be so disposed within the anaerobic tank 20 as to divide the surface into a plurality of relatively small areas 22. As shown in Figure 3, these booms 21 float partly above and partly below the surface of the oil-scum layers, thus providing a barrier to the lateral displacement of these layers by wind action.

The scum layer formed on the surface of the anaerobic zone is found to contain very large numbers of organisms, including bacteria, fungi, algae, protozoans and worms, which do not appear to be affected by the oil. These organisms apparently have the capacity to assimilate the odorous compounds produced by the anaerobic digestion and thus prevent the escape of odors from the anaerobic zone.

The oil is not used for the purpose of forming an oil layer which would prevent the escape of odors from ponds, as such a continuous layer would also adversely affect the activity of the organisms. Accordingly, it is primarily in the sense of inhibiting larvae development that the oil is used. By such use a thick, permanent, odor-eliminating scum is developed at the surface of the anaerobic zone, permitting the carrying out of this process in open ponds or tanks. Where such processes have previously been carried out in open zones, it was necessary that such zones be in isolated localities because of the objectionable stench produced.

The said use of a larvaecide to develop a scum coating is essential under conditions wherein larvae disintegrate and sink scum particles to the extent that a complete odor eliminating layer is prevented from forming on the surface of the pond or tank. Therefore, it is helpful and sometimes necessary to add a larvaecide such as crank case oil to the surface of the treatment zone as the scum is developing. It is also acceptable to apply a partial coating or discontinuous layer of a suitable larvaecide to the surface of the pond or tank before the scum layer has begun to appear.

In providing the protective layer over the scum atop an anaerobic digestion zone, any larvaecide, lighter than water, which is non-toxic to the lower forms of life may be used. While it is preferable from an economy standpoint to use oil or other liquid larvaecide which does not need replenishing, it is within the scope of the present invention to employ any suitable larvaecides which may be applied periodically over the surface of the scum. Any material capable of eliminating insect larvae from the scum while not substantially affecting the microorganisms is considered within the scope of the invention.

The following example sets forth a specific application of the present method and the results obtained thereby: Anaerobic digestion of organic waste materials was carried out in the ordinary manner for a period of six months in an open pond having a capacity of 100,000 gallons. During this time, only a sporadic and incomplete scum layer was formed. Objectionable odors were given off continuously during the treatment period. However, when 50 gallons of crank case oil were sprayed on the surface of the treatment zone, a complete scum later was developed within two weeks. After the surface of the pond had been completely covered with scum, little, if any, objectionable odors were detected. The absence of unpleasant odors and the presence of a thick permanent scum surface remained in evidence until the treatment process was discontinued some six months later.

Obviously, many modifications and variations of the invention as hereinbefore set forth may be made without departing from the spirit and scope thereof, and therefore only such limitations should be imposed as are indicated in the appended claims.

We claim:

1. A method of preventing objectionable odors in an open anaerobic liquid vehicle digestion zone wherein a scum layer containing living microorganisms tends to form on the surface of said zone, said method comprising applying a discontinuous layer of a lighter-than-water larvaecide to the surface of the liquid vehicle which is open to the atmosphere and thereafter maintaining a body of organic material in said open vehicle in a state of anaerobic decomposition to form an odor eliminating scum layer on the surface of said vehicle protected against decomposition by said larvaecide.

2. A method of preventing objectionable odors in an open anaerobic liquid vehicle digestion zone wherein a scum layer containing living microorganisms tends to form on the surface of said zone, said method comprising maintaining a body of organic material in the liquid vehicle which is open to the atmosphere in a state of anaerobic decomposition to form a scum layer of living microorganisms on the surface of the vehicle and applying a discontinuous layer of a lighter-than-water larvaecide to the surface of said vehicle to protect said scum layer from the distintegrating effects of insect larvae.

3. A method of preventing objectionable odors in an open anaerobic liquid vehicle digestion zone wherein a scum layer containing living microorganisms tends to form on the surface of said zone, said method comprising maintaining a body of organic material in the liquid vehicle which is open to the atmosphere in a state of anaerobic decomposition to form a scum layer of living microorganisms on the surface of the vehicle and applying a discontinuous layer of a lighter-than-water larvaecide to the surface of said vehicle in an amount sufficient to destroy insect larvae present on and within the said scum layer and in an amount insufficient to adversely affect the odor-eliminating microorganisms found in the scum layer.

4. A method of preventing objectionable odors in an open anaerobic liquid vehicle digestion zone wherein a scum layer containing living microorganisms tends to form on the surface of said zone, said method comprising maintaining a body of organic material in the liquid vehicle which is open to the atmosphere in a state of anaerobic decomposition to form a scum layer of living microorganisms on the surface of the vehicle and dividing substantially only said scum layer into areas sufficiently small to protect the divided surface scum layer from the dispersing effects of the usual wind conditions and by applying a discontinuous layer of a larvaecide to the surface of said vehicle in an amount sufficient to destroy insect larvae present on and within the said scum layer and in an amount insufficient to adversely affect the odor-eliminating microorganisms found in the scum layer.

References Cited in the file of this patent

UNITED STATES PATENTS

| 88,659 | Millochau | Apr. 6, 1869 |
| 1,399,561 | Imhoff et al. | Dec. 6, 1921 |
| 1,955,064 | Hawley | Apr. 17, 1934 |

OTHER REFERENCES

Sewage Works Practice, Sludge Digestion; by Bloodgood, Water and Sewage Works, August 1954, pages 376 to 378.